(12) United States Patent
Matsuda et al.

(10) Patent No.: US 11,126,422 B2
(45) Date of Patent: Sep. 21, 2021

(54) PROGRAM UPDATE SYSTEM, CONTROL SYSTEM, MOBILE BODY, PROGRAM UPDATE METHOD, RECORDING MEDIUM

(71) Applicant: PANASONIC INTELLECTUAL PROPERTY MANAGEMENT CO., LTD., Osaka (JP)

(72) Inventors: Daiki Matsuda, Osaka (JP); Yasushi Kojima, Osaka (JP); Takahiko Kamitsuji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 9 days.

(21) Appl. No.: 16/807,593

(22) Filed: Mar. 3, 2020

(65) Prior Publication Data

US 2020/0285458 A1 Sep. 10, 2020

(30) Foreign Application Priority Data

Mar. 7, 2019 (JP) .............................. JP2019-041675

(51) Int. Cl.
| G06F 9/44 | (2018.01) |
| G06F 8/65 | (2018.01) |
| G06F 3/06 | (2006.01) |
| B60W 50/00 | (2006.01) |

(52) U.S. Cl.
CPC .............. *G06F 8/65* (2013.01); *G06F 3/0604* (2013.01); *G06F 3/0659* (2013.01); *G06F 3/0673* (2013.01); *B60W 50/00* (2013.01); *B60W 2050/0083* (2013.01)

(58) Field of Classification Search
CPC ........ G06F 8/65; G06F 3/0604; G06F 3/0659; G06F 3/0673; B60W 50/00; B60W 2050/0083
USPC ........................................................ 717/120
See application file for complete search history.

(56) References Cited

U.S. PATENT DOCUMENTS

2015/0363189 A1* 12/2015 Nakamura .............. H04L 43/08
                                                              717/169
2019/0050219 A1   2/2019 Seki

FOREIGN PATENT DOCUMENTS

JP          6361671         7/2018

* cited by examiner

*Primary Examiner* — Chuck O Kendall
(74) *Attorney, Agent, or Firm* — Greenblum & Bernstein, P.L.C.

(57) ABSTRACT

A program update system updating programs comprising: a first control device executing a program stored in the primary storage area thereof; a second control device executing a program stored in the primary storage area thereof; a program storage temporarily storing an acquired program; a program acquirer preferentially acquiring and storing into the program storage a first program to be stored in the first control device, and acquiring and storing into the program storage a second program to be stored in the second control device; and an update unit storing the first program stored in the program storage into the primary storage area of the first control device, storing the second program stored in the program storage into the primary storage area of the second control device, and switching the primary storage area and the secondary storage area of the first control device.

8 Claims, 12 Drawing Sheets

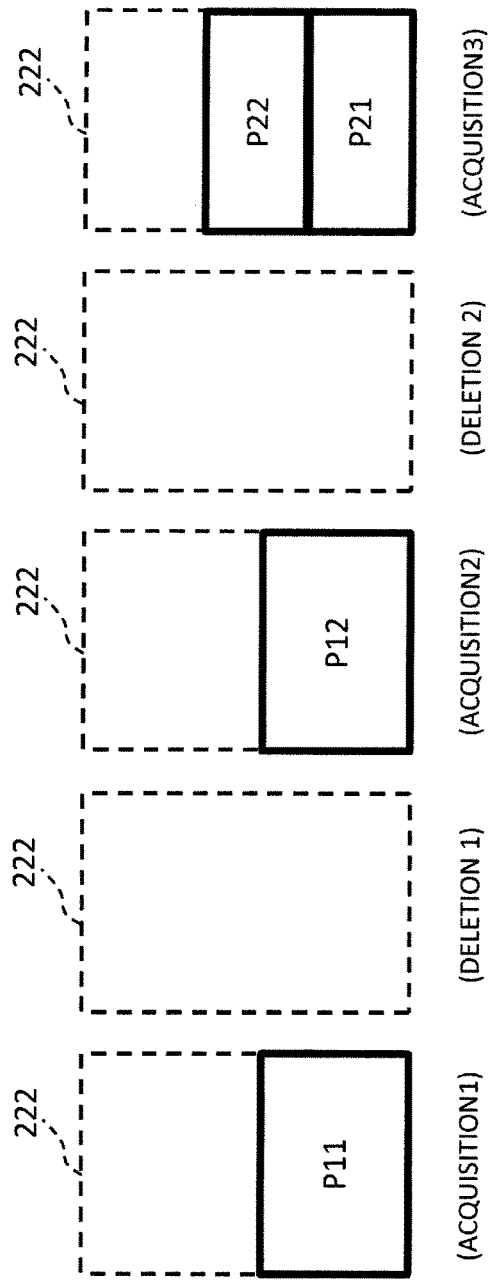
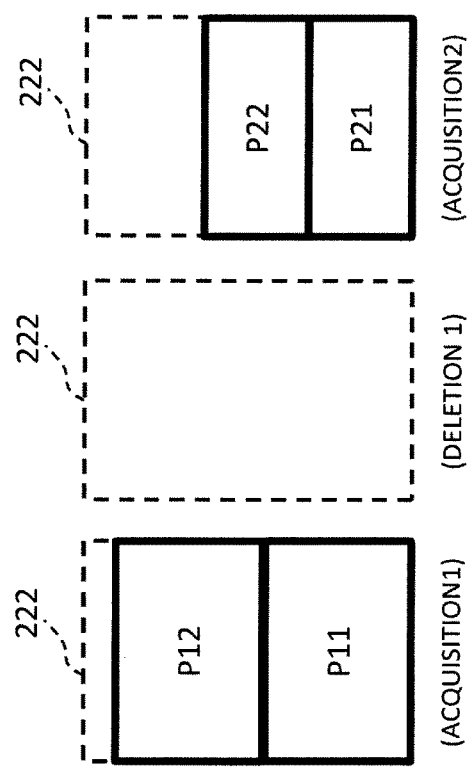
FIG.4A
FIG.4B

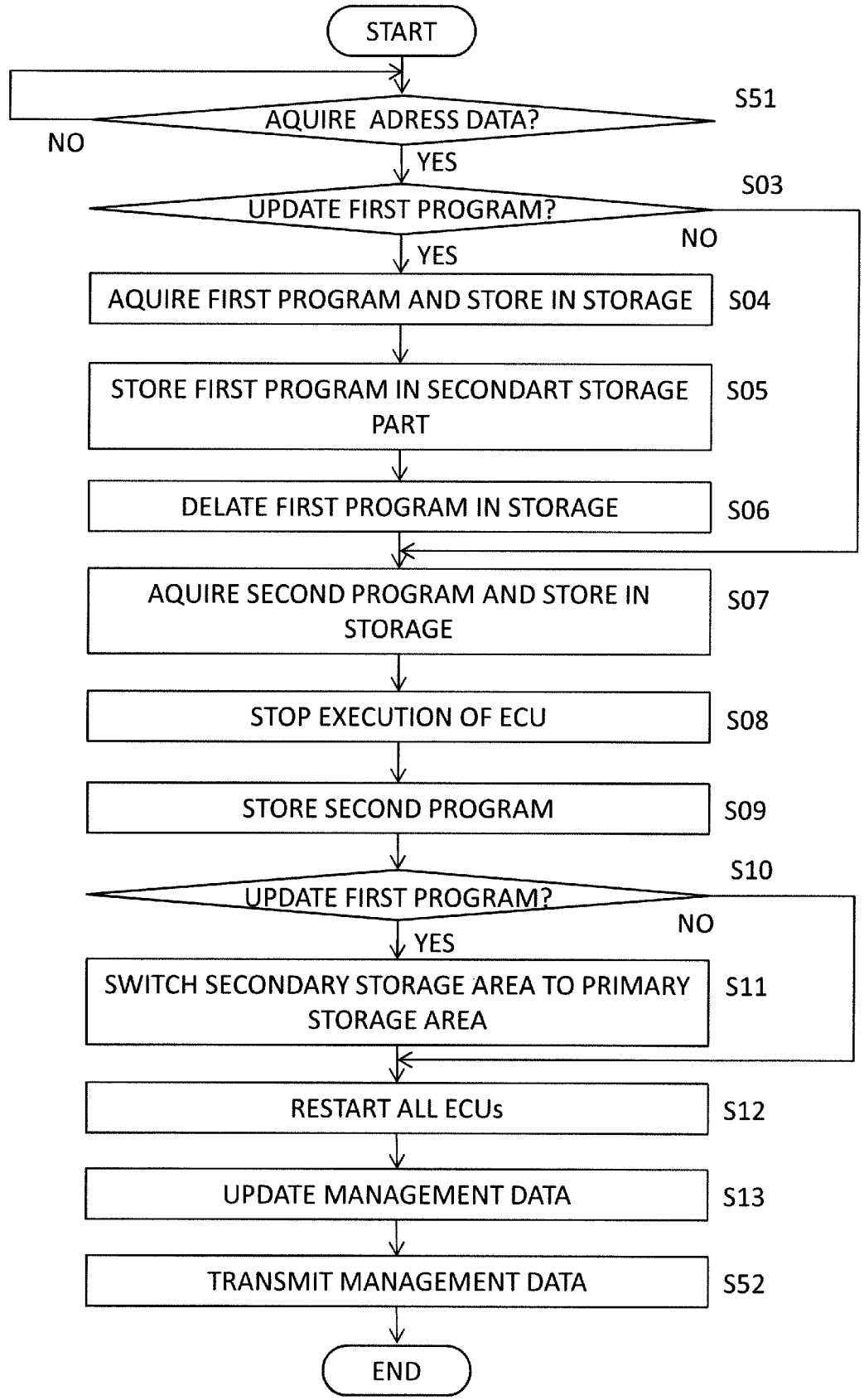

PROGRAM UPDATE SYSTEM, CONTROL SYSTEM, MOBILE BODY, PROGRAM UPDATE METHOD, RECORDING MEDIUM

CROSS-REFERENCE TO RELATED APPLICATIONS

The present application claims priority to Japanese Patent Application No. 2019-041675 filed on Mar. 7, 2019, the disclosure of which is hereby incorporated by reference in its entirety.

BACKGROUND OF THE INVENTION

1. Technical Field

The present disclosure relates to a program update system, a control system, a mobile body, a program update method, and a recording medium.

2. Description of Related Art

In Japanese Patent No. 6361671, it is described that when programs are updated by a control device mounted on a vehicle, multiple update programs confirmed to mutually operate after update are stored in a storage unit in priority to an update program updatable alone. With this technique described in Japanese Patent No. 6361671, even if a free memory space of a relay is insufficient, multiple control devices confirmed to operate can be updated.

SUMMARY

The present disclosure provides a program update system, a control system, a mobile body, a program update method, and a recording medium related to update of programs used in control devices in a control system having multiple control devices.

A program update system of the present disclosure is a program update system updating programs comprising: a management server managing information related to program update; and a control system that is connected to the management server and that includes a plurality of control devices executing the programs and, wherein the management server includes a transmitter transmitting, to the control system, data including an address used for acquiring a program needing to be updated, and wherein the control system includes: a first control device including a primary storage area and a secondary storage area and executing a program stored in the primary storage area thereof; a second control device including a primary storage area without a secondary storage area and executing a program stored in the primary storage area thereof; a program storage temporarily storing an acquired program; a program acquirer preferentially acquiring and storing into the program storage a first program to be stored in the first control device in accordance with data received from the management server, deleting the first program from the program storage when the first program is stored into the secondary storage area of the first control device from the program storage, and acquiring and storing into the program storage a second program to be stored in the second control device; and an update unit storing the first program stored in the program storage into the primary storage area of the first control device, storing the second program stored in the program storage into the primary storage area of the second control device, and switching the primary storage area and the secondary storage area of the first control device.

These general and specific aspects may be implemented by a system, a method, and a computer program, as well as a combination thereof.

The program update system, the control system, the mobile body, the program update method, and the recording medium of the present disclosure enable simultaneous update at the time of program update and can shorten a time during which a user cannot use a control system due to update.

BRIEF DESCRIPTION OF THE DRAWINGS

FIG. 4A is a conceptual diagram for explaining an example of writing and deleting of data in the control system.

FIG. 4B is a conceptual diagram for explaining another example of writing and deleting of data in the control system.

FIG. 11 is a flowchart for explaining an example of a process in a control system according to the third embodiment.

DETAILED DESCRIPTION

[Knowledge Underlying the Present Disclosure]

Figure 1:
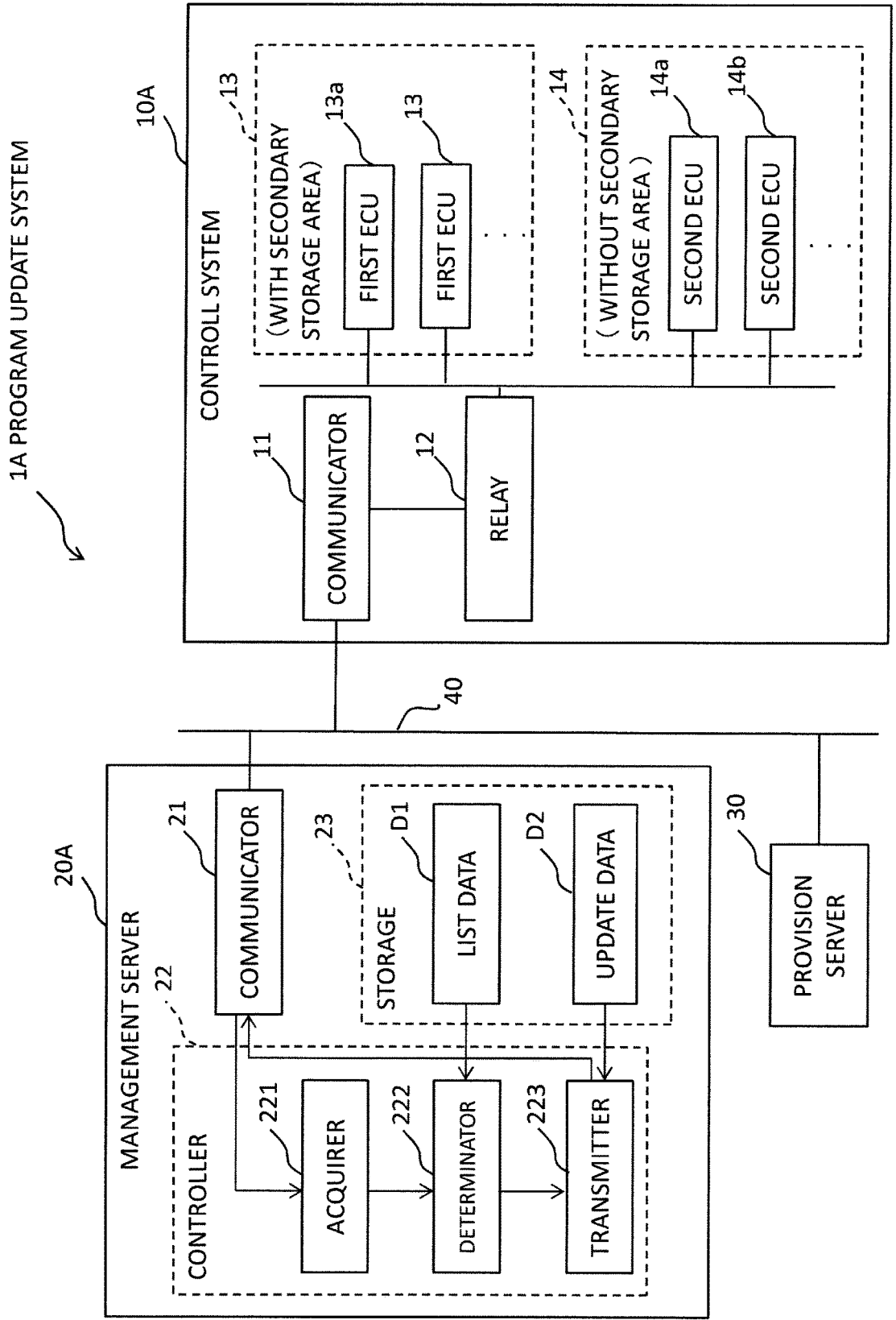
FIG. 1 is a block diagram showing a configuration of a program update system according to a first embodiment.

An automobile is equipped with multiple control devices called ECUs (electronic Control units), for example. Each of the ECUs controls, for example, an accelerator, a brake, a steering wheel operation, vehicle interior lighting, turning-on/off of a headlight, an audio system, a car navigation system, etc. Such ECUs are implemented by respective different programs, and the programs in the ECUs may be updated in accordance with version upgrade of the programs.

Even a mobile body such as an automobile recently has various communication functions and may be attacked by hackers. Being under such attack may cause an accident. Therefore, program update, i.e., a so-called FOTA (Firmware Over-the-Air) technique, is utilized for taking measures against program vulnerability, fixing bugs, and adding functions.

Multiple ECUs mounted on an automobile may be connected to each other to achieve advanced functions such as automatic driving. Programs of multiple related ECUs may be updated at the same time. If multiple programs are updated at the same time in this way, these multiple programs must be once stored in a storage of a relay before being collectively updated at the same time. However, the storage has a limited storage capacity, which makes it difficult to efficiently acquire programs exceeding this capacity. For example, since the control devices do not operate when programs are updated, an automobile cannot be used during this period, which may hinder user's convenience. Specifically, such a program update starting at the timing of driving an automobile causes a trouble that a user cannot drive for a long time.

In the present disclosure, when programs of control devices are updated in a control system including multiple control devices, an acquisition timing of update programs is set depending on a configuration of memories of control devices. As a result, in the present disclosure, the program update can efficiently be performed. Specifically, a program update system, a control system, a mobile body, a program update method, and a recording medium of the present disclosure enable simultaneous update at the time of program update and can shorten a downtime of a user's control system due to update.

Embodiments

A program update system, a control system, a mobile body, a program update method, and a program according to embodiments will now be described with reference to the drawings. The program update system according to the embodiments will be described as a system updating programs implementing multiple control devices (ECUs) included in a mobile body; however, the present disclosure is not limited to such programs. Specifically, the program update system, the control system, the mobile body, the program update method, and the program according to the embodiments can be used as long as multiple different programs are simultaneously updated in multiple control devices. In the following description, the same constituent elements are denoted by the same reference numerals and will not be described.

In the detailed description, unnecessary portions may be omitted in the description related to conventional techniques and substantially the same configurations for the simplicity of the description. The following description and the accompanying drawings are disclosed for enabling those skilled in the art to sufficiently understand the present disclosure and are not intended to limit the subject matter of the claims.

In the following description, a "mobile body" is described as an automobile; however, the mobile body may be any moving object that may be controlled by a control device. For example, the mobile body is a moving object such as a train, an airplane, a drone, a construction machine, and a ship.

"Simultaneous update" is performed with system activation stopped once, rather than repeatedly stopped multiple times, at the time of update of multiple programs.

First Embodiment

<Program Update System>

As shown in FIG. 1, a program update system 1A according to a first embodiment is included in a mobile body, and a control system 10A providing various controls in the mobile body, a management server 20A managing information related to program update, and a provision server 30 providing a program used in the control system 10A are connected via a network 40 and can perform data communication with each other.

The control system 10A includes a communicator 11, a relay 12, and multiple control devices (ECUs) 13 (13a, 13b), 14 (14a, 14b) and is disposed in the mobile body (not shown). The ECUs 13, 14 store respective different programs and provide control of various configurations included in an automobile that is the mobile body.

The control system 10A acquires information related to update of any of the programs stored in the ECUs 13, 14 from the management server 20A and then acquires an updated program from the provision server 30. The configuration of the control system 10A will be described later. In the example shown in FIG. 1, the one control system 10A is included in the program update system 1A for convenience of description; however, the number of control systems is not limited. Therefore, multiple control systems 10A included in multiple different mobile bodies may be connected to the management server 20A and the provision server 30.

The management server 20A manages information related to program update. The management server 20A transmits address data that is information of the provision server 30 providing latest programs to the control system 10A. The configuration of the management server 20A will be described later.

The provision server 30 transmits the latest programs to the control system 10A in response to a request from the control system 10A. In the example shown in FIG. 1, the one provision server 30 is included in the program update system 1A for convenience of description; however, the number of provision servers is not limited. For example, the control system may include the multiple ECUs 13, 14 each having a program provided from a different provision server. Therefore, the control system 10A may be connected to multiple provision servers 30.

The network 40 is a network used for data transmission/reception among the control system 10A, the management server 20A, and the provision server 30, and the communication method thereof is not limited. As described above, the control system 10A is included in the mobile body. Therefore, for example, a portion of the network 40 is connected to the control system 10A by using wireless communication.

<Control System>

Figure 2:
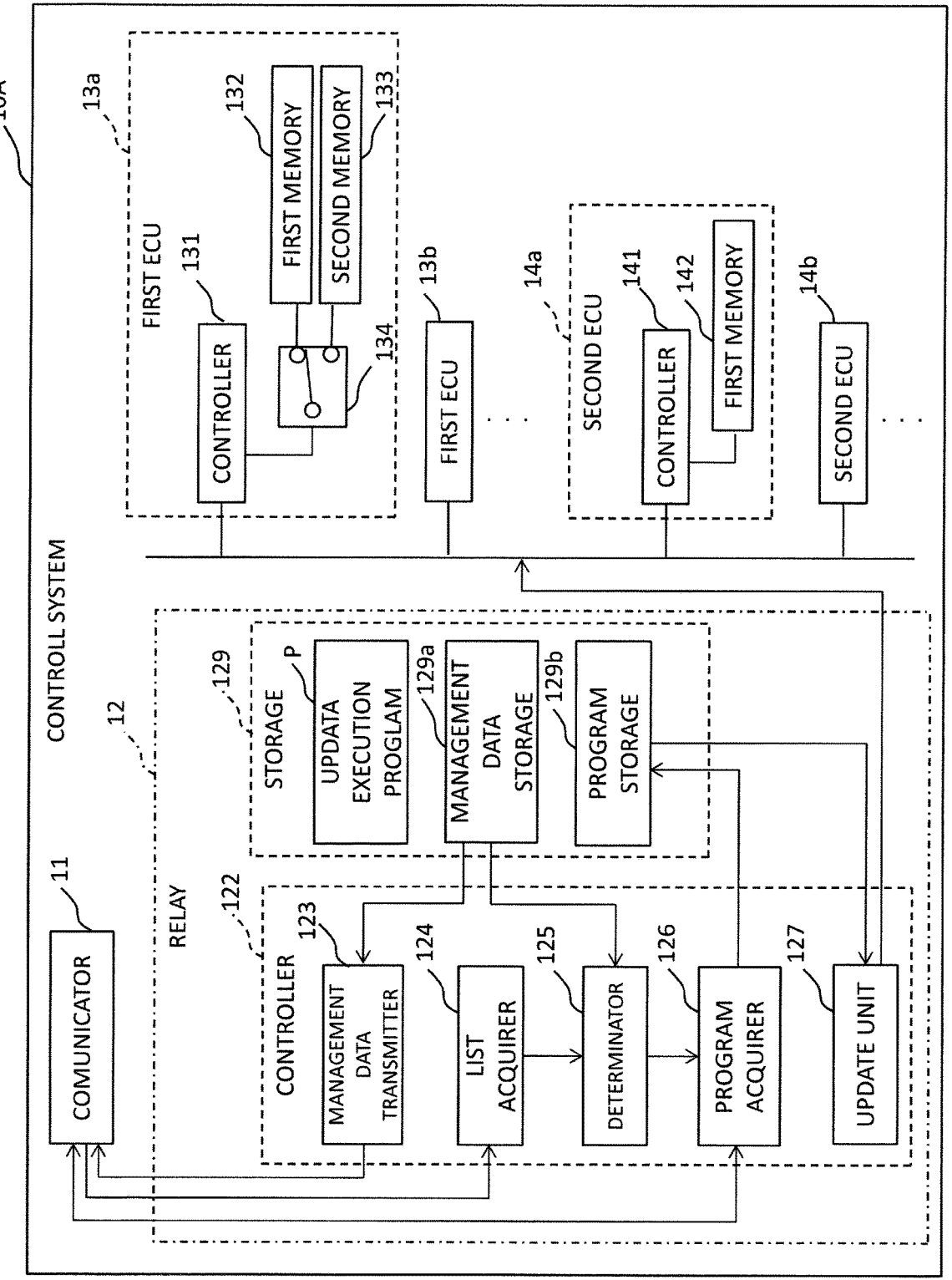
FIG. 2 is a block diagram showing a configuration of a control system according to the first embodiment.

As shown in FIG. 2, the control system 10A includes the communicator 11 achieving communication via the network 40, the relay 12, first ECUs 13 (13a, 13b), and second ECUs 14 (14a, 14b).

The first ECUs 13 each include a primary storage area and a secondary storage area, while the second ECUs 14 each include only a primary storage area and does not include a secondary storage area. For example, a first memory 132 is the primary storage area that is a main memory, and a second memory is the secondary storage area that is a spare memory. The first ECUs 13 each execute a program stored in the primary storage area that is the main memory.

The "secondary storage area" is a storage area that is prepared in advance for the purpose of storing a version-upgraded program and that is other than an area in which a currently executed program is stored, out of multiple storages or in an area divided into multiple sections for storing programs.

For example, as shown in FIG. 2, the first ECU 13a includes the first memory 132 and the second memory 133 so that the controller 131 can switch the primary storage area and the secondary storage area by using a switch 134. Specifically, in the example shown in FIG. 2, the controller 131 and the first memory 132 are connected via the switch 134. Therefore, the first memory 132 serves as the primary storage area, and the controller 131 executes a program stored in the first memory 132. In this case, the second memory 133 is the secondary storage area. If the switch 134 is switched, and the controller 131 is disconnected from the first memory 132 and connected to the second memory 133, the first memory 132 serves as the secondary storage area while the second memory 133 serves as the primary storage area, and therefore, the controller 131 executes a program stored in the second memory 133 serving as the primary storage area. In the example described below, the first memory 132 serving as the primary storage area and the second memory 133 serving as the secondary storage area are switched. If a program is executed while a program is updated, both the primary storage area storing the program being executed and the secondary storage area used for writing and verification of the update program may be accessed in some cases; however, this case will not be described.

Although not shown, the first ECU 13b is also configured to include the controller 131, the memories 132, 133, and the switch 134, for example, as with the first ECU 13a. Therefore, the first ECU 13b also includes the primary storage area and the secondary storage area of the memories, and the controller 131 can used the memories while switching the area to be connected.

The switching of the controller 131 and the memories 132, 133 is not limited to the configuration using the switch 134 shown in FIG. 2. Specifically, it is not necessary to use a configuration in which the two memories 132, 133 are physically used and switched by the switch 134. For example, write/read areas in one memory may be configured to be switched depending on timing. Therefore, the memories having the primary storage area and the secondary storage area can be achieved in various forms including a multiple bank configuration such as a 2-bank configuration, a multiple directory configuration, use of multiple SD cards, use of network storage, etc.

A program stored in the memories 132, 133 of the first ECU 13 is referred to as a "first program", and a program stored in the memory 142 of the second ECU 14 is referred to as a "second program". In other words, a program executed by the first ECU 13 having the primary storage area and the secondary storage area is referred to as the first program, and a program executed by the second ECU 14 having no secondary storage area is referred to as the second program. Therefore, each of the ECUs 13 executes a process in accordance with the first program stored in the memory 132 or 133, and each of the ECUs 14 executes a process in accordance with the second program stored in the memory 142. For example, the controllers 131, 141 respectively provide controls of an accelerator, a brake, a steering wheel operation, vehicle interior lighting, turning-on/off a headlight, an audio system, a car navigation system, etc.

In the example shown in FIG. 2, the control system 10A includes the two first ECUs 13a, 13b and the two second ECUs 14a, 14b for convenience; however, the numbers thereof are not limited. Automobiles often include a multiplicity of ECUs, and the number thereof may exceed 100 or 200, for example.

The ECUs 13, 14 cannot communicate with an external device. Therefore, when the programs of the ECUs 13, 14 are updated in the control system 10A, first, the relay 12 once acquires the programs used in the ECUs 13, 14 and temporarily stores the programs in a program storage 129b. Subsequently, the relay 12 writes the program stored in the program storage 129b into the memories 132, 133, 142 of the corresponding ECUs 13, 14.

Figure 3:
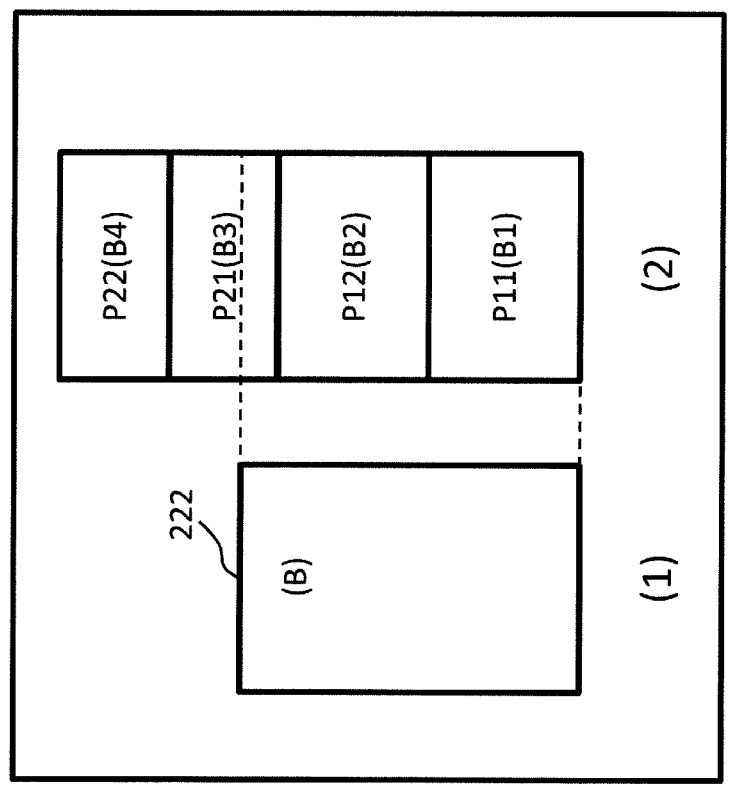
FIG. 3 is a conceptual diagram for explaining a relationship between a storage capacity of a program storage included in the control system and a data capacity of programs to be stored.

As shown in (1) of FIG. 3, it is assumed that the program storage 129b in the control system 10A has a maximum storage capacity of "B". As shown in (2) of FIG. 3, it is also assumed that a program P11 executed by the first ECU 13a has a data volume of "B1", that a program P12 executed by the first ECU 13b has a data volume of "B2", that a program P21 executed by the second ECU 14a has a data volume of "B3", and that a program P22 executed by the second ECU 14b has a data volume of "B4".

In the example shown in FIG. 3, the total data volume (B1+B2+B3+B4) of the programs P11, P12, P21, P22 exceeds the storage capacity (B) of the program storage 129b of the relay 12. Therefore, in this example, the relay 12 cannot store all the programs P11 to P22 in the program storage 129b at the same time. Thus, the control system 10A according to the present disclosure sequentially acquires the programs P11 to P22 with a method described later to efficiently achieve the program update.

The communicator 11 is an interface circuit (module) enabling communication with the management server 20A via the network 40. For example, the communicator 11 performs communication in accordance with standards such as Wi-Fi, IEEE 802.2, IEEE 802.3, 3G, LTE, and 5G.

The relay 12 relays communication between an external device that is a so-called gateway and the multiple ECUs 13, 14 and includes a controller 122 and a storage 129, for example.

The storage 129 is a non-transitory computer-readable recording medium storing program and information and is, for example, a recording medium recording various types of information. The storage 129 is implemented as, for example, a RAM, a ROM, a flash memory, an SSD (solid state device), a hard disk, other storage devices, or an appropriate combination thereof.

The storage 129 at least includes a management data storage 129a storing management data, and the program storage 129b temporarily storing a program acquired from the provision server 30 described above with reference to FIG. 1. The storage 129 also stores an update execution program P for executing a program update process in the control system 10A.

The management data stored in the management data storage 129a is data associating ECU identification information such as model numbers of the ECUs 13, 14 with version numbers etc. identifying the versions of the programs stored in the memories of the ECUs 13, 14. For example, this management data can be used for determining whether each of the ECUs 13, 14 has the secondary storage area.

Although not described with reference to the drawings, when new programs are stored in the memories 132, 133, 142 of the ECUs 13, 14, the management data stored in the management data storage 129a is rewritten as data associating the information with the version numbers etc. identifying the versions of the newly stored programs. Therefore, the versions of the programs currently used in the ECUs 13, 14 are managed with the management data.

The program storage 129b stores new programs acquired at the time of program update of the ECUs 13, 14. As described above with reference to FIG. 3, the program storage 129b has a preliminarily limited storage capacity and cannot store programs having a data volume exceeding the storage capacity. Therefore, when acquiring multiple programs having a total data volume exceeding the storage capacity of the program storage 129b, the control system 10A acquires the data multiple times in a divided manner.

The controller 122 is a CPU, MPU, etc. serving as a controller responsible for control of the entire control system 10A. The controller 122 retrieves and executes the update execution program P stored in the storage 129 to execute processes as a management data transmitter 123, a list acquirer 124, a determinator 125, a program acquirer 126, and an update unit 127 as shown in FIG. 2. The controller 122 is not limited to a unit achieving a predetermined function through a cooperation between hardware and software and may be a hardware circuit designed exclusively for achieving a predetermined function. Therefore, the controller 122 can be implemented by various processors such as CPU, MPU, GPU, FPGA, DSP, and ASIC.

The management data transmitter 123 transmits the management data stored in the management data storage 129a to the management server 20A at a predetermined timing. The predetermined timing is a timing for confirming whether a program for executing each of the ECUs is updated and is, for example, a timing at which an accessory power source of the automobile is turned on so that the communicator can communicate. Additionally, for example, the predetermined timing is a timing of a periodic update when a certain period has elapsed from a previous program update.

The list acquirer 124 acquires address data that is information related to a program update from the management server 20A. For example, the address data is data associating the model numbers of the ECUs 13, 14 requiring the program update in the control system 10A with addresses used for acquisition of the programs.

The determinator 125 determines whether the ECU having a program to be updated has the secondary storage area. As described above, whether the memories have the secondary storage area can be determined by using a model number etc. included in the management data stored in the management data storage 129a. Therefore, the determinator 125 reads and uses the management data in the management data storage 129a for the determination.

When the determination by the determinator 125 is completed, the program acquirer 126 starts acquiring a new program for the update. The program acquirer 126 preferentially acquires the first program needing to be updated before acquiring the second program needing to be updated.

Specifically, the program acquirer 126 preferentially acquires and stores the first program from the provision server 30 into the program storage 129b and outputs a notification of completion of acquisition of the first program to the update unit 127. When a notification of completion is input from the update unit 127 in terms of writing of the first program from the program storage 129b to the second memory 133 serving as the secondary storage area of the first ECU 13a, the program acquirer 126 deletes the first program in the program storage 129b. Subsequently, the program acquirer 126 acquires and stores the second program from the provision server 30 into the program storage 129b and outputs a notification of completion of acquisition of the second program to the update unit 127. For example, when a notification of completion is input from the update unit 127 in terms of storage of the second program in the memory 142, the program acquirer 126 may delete the second program stored in the program storage 129b.

If multiple first programs need to be updated and have a total data amount exceeding the storage capacity of the program storage 129b, the program acquirer 126 acquires the first programs multiple times in a divided manner. If multiple second programs need to be updated and have a total data amount exceeding the storage capacity of the program storage 129b, the program acquirer 126 acquires the second programs multiple times in a divided manner.

The program acquirer 126 may acquire an entire updated program, i.e., new program, or may acquire a portion of the updated program. Acquiring a portion means obtaining only a difference between the program of the version identified by the management data stored in the management data storage 129a and the program of the latest version. For example, only a portion of a past program is rewritten in an update program in some cases and, in such a case, acquiring only the rewritten portion can shorten the time required for program acquisition and can reduce the capacity used in the program storage 129b at the time of the program update.

When a notification of storage of the new first program in the program storage 129b is input from the program acquirer 126, the update unit 127 stores the new first program stored in the program storage 129b into the memory 133 serving as the secondary storage area of the first ECU 13. When a notification of storage of the new second program in the program storage 129b is input from the program acquirer 126, the update unit 127 stores the new second program stored in the program storage 129b into the memory 142 of the second ECU.

Additionally, the update unit 127 restarts the ECUs 13, 14 to execute the new programs. Specifically, after storing the first program into the second memory 133, the update unit 127 stops execution of the programs in the multiple control devices so as to change the second ECU 14 from a normal state of executing the program to a repro mode (a mode of executing a dedicated process for updating a program). As a result, the repro mode is achieved so that the new second program can be stored in the memory 142 of second ECU. The update unit 127 writes the second program into the memory 142 of the second ECU 14, switches the first memory 132 and the second memory 133 of the first ECU 13a to set the second memory 133 as the primary storage area, and then restarts all the ECUs 13, 14 to execute the program update process. For example, the update unit 127 may delete the second program from the program storage 129b at the timing when the second program is stored into the memory 142.

(Program Update)

An example in the case of acquiring the programs P11, P12, P21, P22 will be described with reference to FIG. 4A. The program acquirer 126 acquires and writes the first program P11 into the program storage 129b. The update unit 127 stores the first program P11 in the program storage 129b into the second memory 133 serving as the secondary storage area of the first ECU 13a (Acquisition 1). Subsequently, the program acquirer 126 deletes the first program P11 in the program storage 129b (Deletion 1).

The program acquirer 126 then acquires and writes the first program P12 into the program storage 129b. The update unit 127 stores the first program P12 in the program storage 129b into the second memory 133 serving as the secondary storage area of the first ECU 13b (Acquisition 2). Subsequently, the program acquirer 126 deletes the first program P12 in the program storage 129b (Deletion 2).

Subsequently, the program acquirer 126 acquires and writes the second programs P21, P22 into the program storage 129b. The update unit 127 stores the second program P21 in the program storage 129b into the memory 142 of the second ECU 14a and stores the second program P22 into the memory 142 of the second ECU 14b (Acquisition 3).

When the programs are updated, the control system 10A needs to stop the system. The system is stopped since no process can be executed for the time required for writing and restarting of the memories in the ECUs 13, 14. If the second memory 133 serving as the secondary storage area cannot be used in the example of FIG. 4A, the system must be stopped from the timing of the start of writing of the first program P11 from the program storage 129b into the first memory 132 in "Acquisition 1" until the timing of the end of writing of the second programs P21, P22 from the program storage 129b into the memories 142. Specifically, this is because the second memory 133 serving as the secondary storage area is not required for execution of the ECU 13, and therefore, the program stored in the first memory 132 serving as the primary storage area can be used for executing a process without stopping the control system 10A.

In the example of the method shown in FIG. 4A, the first programs P11, P12 are written into the memory 133 serving as the secondary storage area, instead of the memory 132 serving as the primary storage area in which the program to be executed is stored, so that the system does not need to be stopped at the time of writing into the memories. Therefore, in the example shown in FIG. 4A, the system may be stopped only while the second programs P21, P22 are written from the program storage 129b into the memories 142 in "Acquisition 3". Therefore, using the method shown in FIG. 4A can minimize the time during which a user cannot use the control system 10A.

The program writing method is not limited to the method shown in FIG. 4A and may be performed as shown in FIG. 4B, for example. In the example shown in FIG. 4B, the program acquirer 126 acquires and writes the first programs P11, P12 into the program storage 129b. The update unit 127 stores the first program P11 in the program storage 129b into the second memory 133 serving as the secondary storage area of the first ECU 13a and stores the first program P12 into the second memory 133 serving as the secondary storage area of the first ECU 13b (Acquisition 1). Subsequently, the program acquirer 126 deletes the first program P11 and the first program P12 in the program storage 129b (Deletion 1.)

The program acquirer 126 then acquires and writes the second programs P21, P22 into the program storage 129b, and the update unit 127 stores the second program P21 in the program storage 129b into the memory 142 of the second ECU 14a and stores the second program P22 into the memory 142 of the second ECU 14b (Acquisition 2).

Similarly, in the example shown in FIG. 4B, the system may be stopped only while the second programs P21, P22 are written from the program storage 129b into the memories 142 in "Acquisition 2". Therefore, as in the case described above with reference to FIG. 4A, the method can minimize the time during which a user cannot use the control system 10A.

<Management Server>

The management server 20A will be described with reference to FIG. 1. The management server 20A includes a communicator 21, a controller 22, and a storage 23.

The communicator 21 is an interface circuit (module) for enabling communication with the control system 10A via the network 40. The communicator 21 performs communication in accordance with standards such as Wi-Fi, IEEE 802.2, IEEE 802.3, 3G, LTE, and 5G.

The storage 23 is a storage medium storing information and is, for example, a recording medium recording various types of information. The storage 23 is implemented as, for example, a RAM, a ROM, a flash memory, an SSD (solid state device), a hard disk, other storage devices, or an appropriate combination thereof. The storage 23 stores list data D1 and update data D2.

The controller 22 is a controller responsible for control of the entire management server 20A. The controller 22 includes a general-purpose processor such as a CPU or an MPU achieving a predetermined function by executing a program. For example, in the management server 20A, a management program (not shown) stored in the storage 23 is read and executed so that the controller 22 executes processes as an acquirer 221, a determinator 222, and a transmitter 223. The controller 22 is not limited to a unit achieving a predetermined function through a cooperation between hardware and software and may be a hardware circuit designed exclusively for achieving a predetermined function. Therefore, the controller 22 can be implemented by various processors such as CPU, MPU, GPU, FPGA, DSP, and ASIC.

The management server 20A may be implemented by a single computer or may be implemented by a combination of multiple computers connected via a network. For example, all or a portion of data stored in the storage 23 may be stored in an external storage medium connected via the network 40, and the management server 20A may be configured to use the data stored in the external storage medium. Specifically, the list data D1 and the update data D2 may be stored in the external storage medium.

The list data D1 is data related to the latest program enabling the execution of the ECUs 13, 14. For example, the list data D1 associates the identification information of the control system 10A, the model numbers etc. defined as the identification information of the ECUs 13, 14 included in the control system 10A, and the latest version numbers of the programs.

The update data D2 is data related to access information of the provision server 30 providing the programs enabling the execution of the ECUs 13, 14. For example, the update data D2 associates the model numbers etc. defined as the identification information of the ECUs 13, 14 with the address of the provision server 30 providing the programs used by the ECUs. Specifically, the update data D2 includes the IP address and domain name of the provision server 30 providing the programs.

The acquirer 221 acquires the management data transmitted from the control system 10A. The acquired management data is output to the determinator 222.

The determinator 222 determines the necessity of program update depending on whether the program used by each of the ECUs 13, 14 is the latest version. Specifically, the determinator 222 reads the list data D1 from the storage 23 and compares the version number included in the management data with the version number included in the list data D1. If the programs currently available to the ECUs 13, 14 are not the latest version as a result of the comparison, the determinator 222 determines that the program update is required. Specifically, if the version numbers of the programs included in the management data are different from the version numbers of the programs in the list data D1, the determinator 222 determines that the programs are not the latest version and need to be updated.

If it is determined that the control device requiring a program update exists, the transmitter 223 transmits the address data used for the program update. Specifically, the transmitter 223 generates the address data including the model number etc. defined as the identification information of the ECUs 13, 14 and the address of the provision server included in the update data D2 for the program needing to be updated. The transmitter 223 transmits the generated address data to the control system 10A.

The program update system 1A according to the first embodiment described above enables simultaneous update of multiple programs at the time of the program update in the control system 10A and can shorten the stop time due to the simultaneous update in the control system 10A so that the efficient program update can be implemented.

<Program Update Method>

An example of a program update process will be described with reference to flowcharts shown in FIGS. 5 and 6.

(Control System)

The process in the control system 10A will first be described with reference to FIG. 5.

The control system 10A transmits the management data to the management server 20A at a predetermined timing (S01).

If no address data is acquired from the management server 20A in response to the management data transmitted at step S01 (NO at S02), the control system 10A terminates the process since no program is to be updated.

In contrast, if the address data is acquired (YES at S02), the control system 10A determines whether the first program needing to be updated exists (S03).

If the first program needing to be updated exists (YES at S03), the control system 10A acquires the first program needing to be updated in accordance with the acquisition method included in the address data acquired at step S02 and stores the first program into the storage 129b (S04).

Subsequently, the control system 10A stores the first program stored in the program storage 129b into the second memory 133 serving as the secondary storage area of the first ECU 13 (S05).

The control system 10A then deletes the first program stored in the program storage 129b (S06).

If no first program needs to be updated (NO at S03), the control system 10A goes to step S07 without executing the processes of steps S04 to S06.

The control system 10A then acquires the second program needing to be updated in accordance with the acquisition method included in the address data acquired at step S02 and stores the second program into the program storage 129b (S07).

Subsequently, the control system 10A changes the second ECU to the repro mode (S08). As a result, the execution of the program stops in the second ECU.

The control system 10A then stores the second program stored in the program storage 129b into the memory 142 of the second ECU 14 (S09).

The control system 10A determines whether the first program is updated (S10). In other words, the control system 10A determines whether the first program is stored in the second memory 133 serving as the secondary storage area at step S05.

If the first program is updated (YES at S10), the control system 10A switches the second memory 133 serving as the secondary storage area to the primary storage area (S11).

If the first program is not updated (NO at S10), the control system 10A goes to step S12 without executing the process of step S11.

Subsequently, the control system 10A restarts all the ECUs at the same time (S12). As a result, the ECUs 13, 14 of the control system 10A are executed with the latest programs.

The control system 10A updates the management data in the management data storage 129a with the version of the updated program (S13).

(Management Server)

The process in the management server 20A will then be described with reference to FIG. 6.

The management server 20A receives the management data transmitted from the control system 10A (S21).

Subsequently, the management server 20A reads the list data D1 from the storage 23, compares the management data received at step S21 with the read list data D1, and determines whether a program needing to be updated exists (S22). In other words, it is determined whether each of the ECUs 13, 14 of the control system 10A is using the latest program.

If no program needs to be updated (NO at S22), the management server 20A terminates the process.

If a program needing to be updated exists (YES at S22), the management server 20A reads the update data D2 from the storage 23 and generates the address data (S23). Specifically, the management server 20A extracts the address of the provision server 30 providing the program to be updated from the read update data D2 to generate the address data.

The management server 20A transmits the address data generated at step S23 to the control system 10A (S24).

Figure 5:
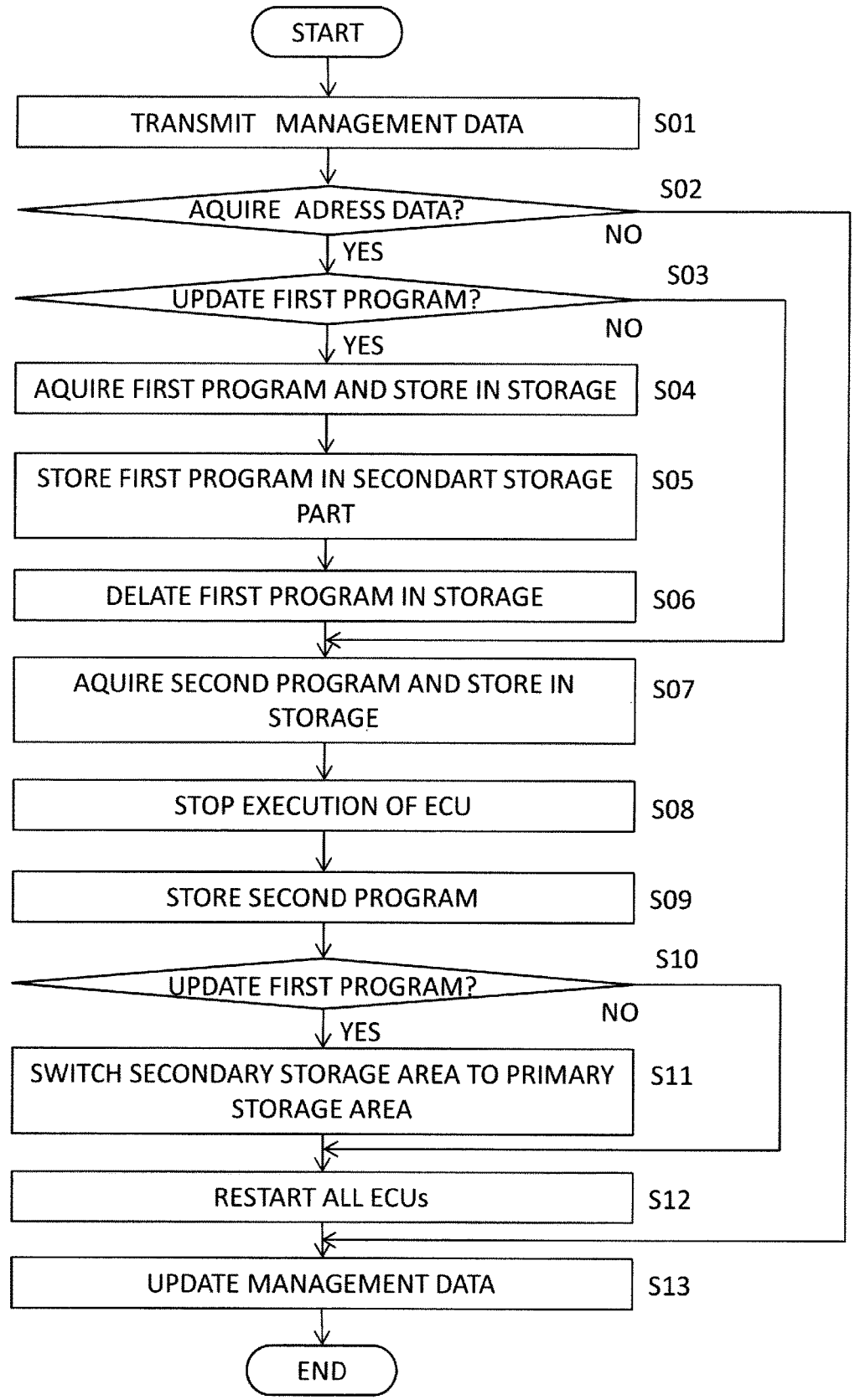
FIG. 5 is a flowchart for explaining an example of a process in the control system according to the first embodiment.
Figure 6:
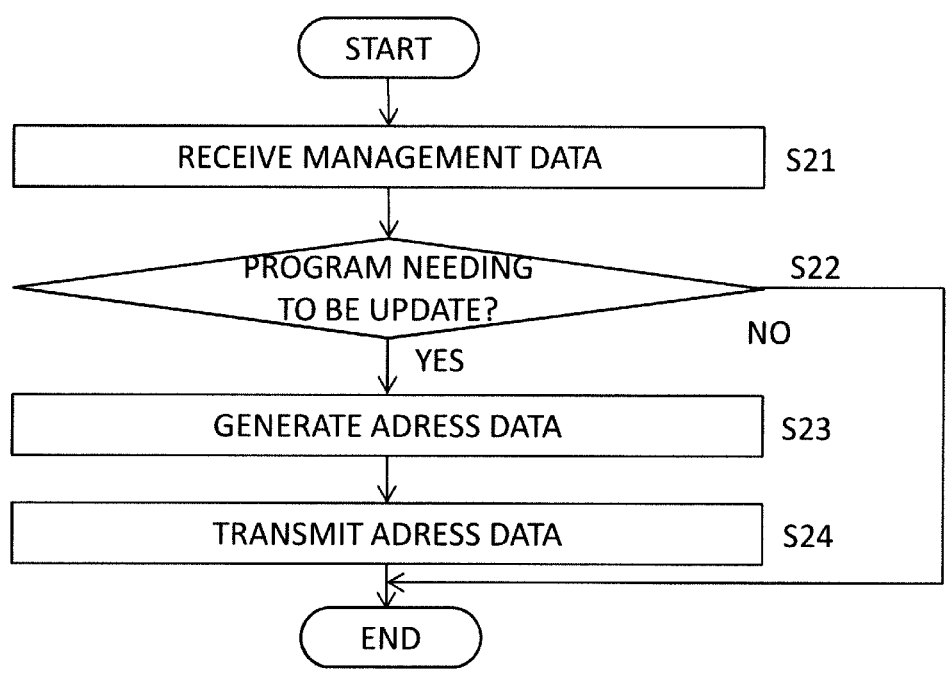
FIG. 6 is a flowchart for explaining an example of a process in a management server according to the first embodiment.

The address data transmitted from the management server 20A in this way is received and used by the control system 10A (step S02 and subsequent steps of FIG. 5).

The program update method described above enables simultaneous update of multiple programs and can shorten the stop time due to the simultaneous update in the control system 10A so that the efficient program update can be implemented.

Second Embodiment

<Program Update System>

Figure 7:
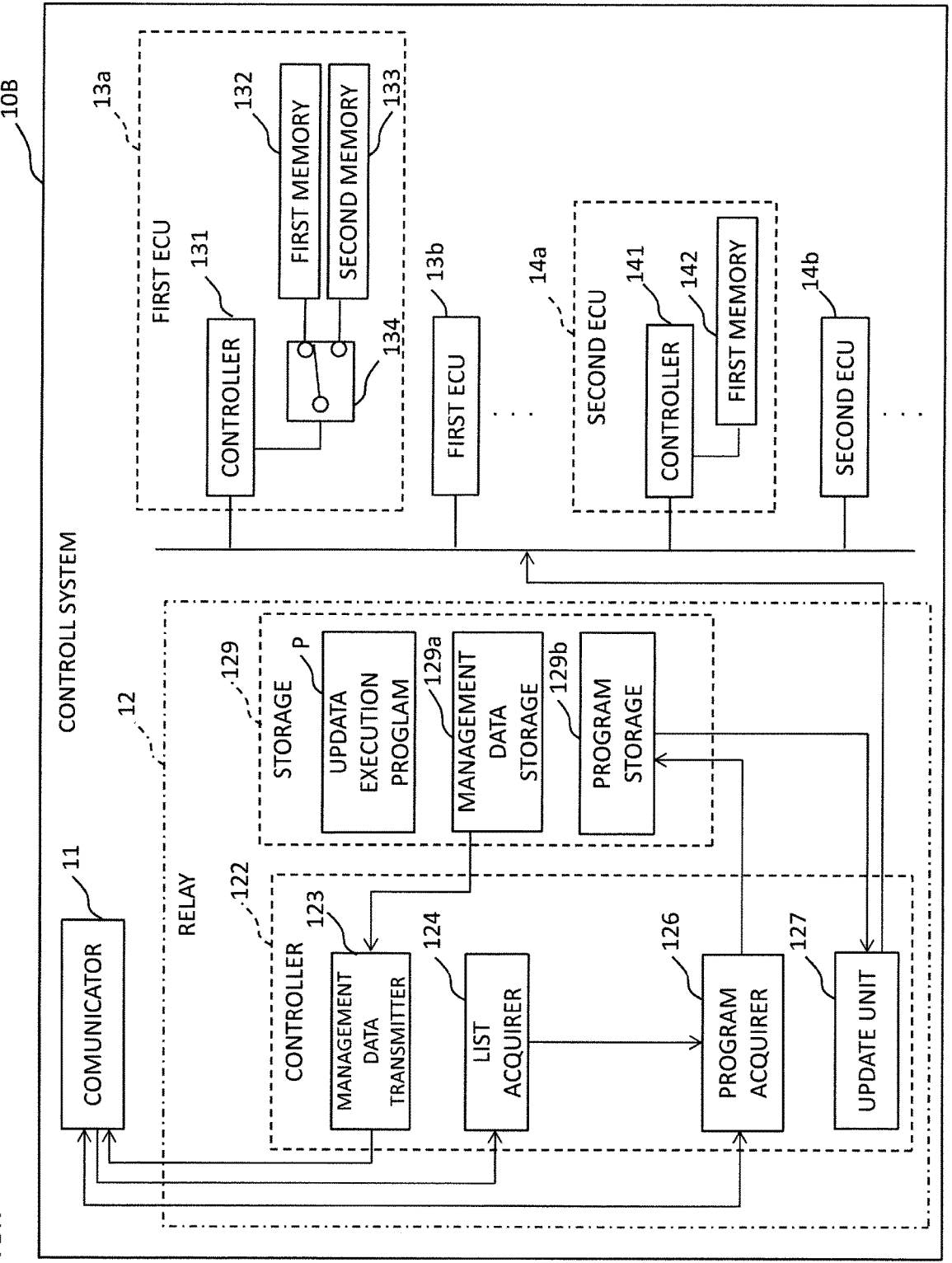
FIG. 7 is a block diagram showing a configuration of a control system according to a second embodiment.

The configuration of the program update system according to a second embodiment is the configuration described above with reference to FIG. 1 and will be described with reference to FIG. 1. FIG. 7 shows a control system 10B according to the second embodiment.

<Control System>

The control system 10B according to the second embodiment shown in FIG. 7 is different from the control system 10A according to the first embodiment shown in FIG. 2 in that the determinator 125 is not included.

In the control system 10A, the list acquirer 124 acquires the address data including addresses for acquiring all the programs needing to be updated. Additionally, the determinator 125 determines whether the program acquired by using each of the addresses included in the address data is the first program used in the first ECU 13 having the secondary storage area of the memory or the second program used in the second ECU 14 without the secondary storage area of the memory.

In contrast, in the control system 10B, the list acquirer 124 separately acquires an address for acquiring the first program and an address for acquiring the second program from the management server 20A. Specifically, the list acquirer 124 distinguishes and acquires first address data including only the address for acquiring the first program and second address data including only the address for acquiring the second program. Therefore, it is not necessary to determine whether the program acquired at each address is the first program or the second program in the relay 12.

The program acquirer 126 preferentially acquires the first program needing to be updated, based on the first address data acquired by the list acquirer 124. After completing the acquisition based on the first address data, the program acquirer 126 acquires a second program needing to be updated, based on the second address data acquired by the list acquirer 124.

Therefore, the control system 10B according to the second embodiment can reduce a processing load for determining whether the program acquired at each of the addresses included in the address data is the first program or the second program in the relay 12.

<Management Server>

As described above, the management server 20A (FIG. 1) according to the second embodiment separately transmits the first address data and the second address data.

Therefore, in the second embodiment, the determinator 222 determines whether a program needing to be updated exists in each of the ECUs 13, 14 of the control system 10B and whether each program is the first program used in the first ECU 13 having the secondary storage area of the memory or the second program used in the second ECU 14 without the secondary storage area of the memory. In this case, the determinator 222 determines whether the program is the first program or the second program, based on the management data acquired by the acquirer 221 from the control system 10B. The determinator 222 identifies whether the memory has the secondary storage area based on information such as the model numbers of the ECUs 13, 14 included in the management data.

The transmitter 223 generates the first address data for the first program needing to be updated, generates the second address data for the second program needing to be updated, and transmits the generated first and second address data to the control system 10B.

The program update system according to the second embodiment described above enables simultaneous update of multiple programs at the time of the program update in the control system 10B, can shorten the stop time due to the simultaneous update in the control system 10B, and reduces the processing load on the control system 10B so that the efficient program update can be implemented.

<Program Update Method>

An example of a program update process according to the second embodiment will be described with reference to flowcharts shown in FIGS. 8 and 9.

(Control System)

The process in the control system 10B of the second embodiment will first be described with reference to FIG. 8. The same processes as those described above with reference to FIG. 5 are denoted by the same reference numerals and will not be described.

The control system 10B determines whether the first address data is acquired from the management server 20A for the management data transmitted at step S01 (S31).

If the first address data is acquired (YES at S31), the first program to be updated exists, so that the control system 10B executes the processes of steps S04 to S06.

In contrast, if the first address data is not acquired (NO at S31), no first program to be updated exists, so that the control system 10B goes to step S32 without executing the processes of steps S04 to S06.

The control system 10B determines whether the second address data is acquired from the management server 20A for the management data transmitted at step S01 (S32).

If the second address data is acquired (YES at S32), the second program to be updated exists, so that the control system 10B executes the processes of steps S07 to S09.

In contrast, if the second address data is not acquired (NO at S32), no second program to be updated exists, so that the control system 10B goes to step S10 without executing the processes of steps S07 to S09.

After steps S10 and S11, the control system 10B determines whether the program is updated (S33).

If the program is updated (YES at S33), the control system 10B restarts all the ECUs at the same time (S12). As a result, the ECUs 13, 14 of the control system 10B are executed with the latest programs.

Additionally, the control system 10B updates the management data in the management data storage 129a with the version of the updated program (S13).

If the program is not updated (NO at S33), i.e., if none of the first and second address data are acquired and the program is not updated, the restart of the ECUs is not required, so that the control system 10B terminates the process.

(Management Server)

The process in the management server 20A of the second embodiment will then be described with reference to FIG. 9. The same processes as those described above with reference to FIG. 6 are denoted by the same reference numerals.

The management server 20A receives the management data transmitted from the control system 10A (S21).

Subsequently, the management server 20A reads the list data D1 from the storage 23 and compares the management data received at step S21 with the read list data D1, and if no program needs to be updated (NO at S22), the management server 20A terminates the process.

In contrast, if one or more programs needing to be updated exist (YES at S22), the management server 20A determines whether the first program used by the ECU 13 having the secondary storage area of the memory exists in the one or more programs needing to be updated (S41).

If the first program needing to be updated exists (YES at S41), the management server 20A generates the first address data including the address of the first program needing to be updated (S42).

The management server 20A transmits the first address data generated at step S42 to the control system 10B (S43).

Figure 8:
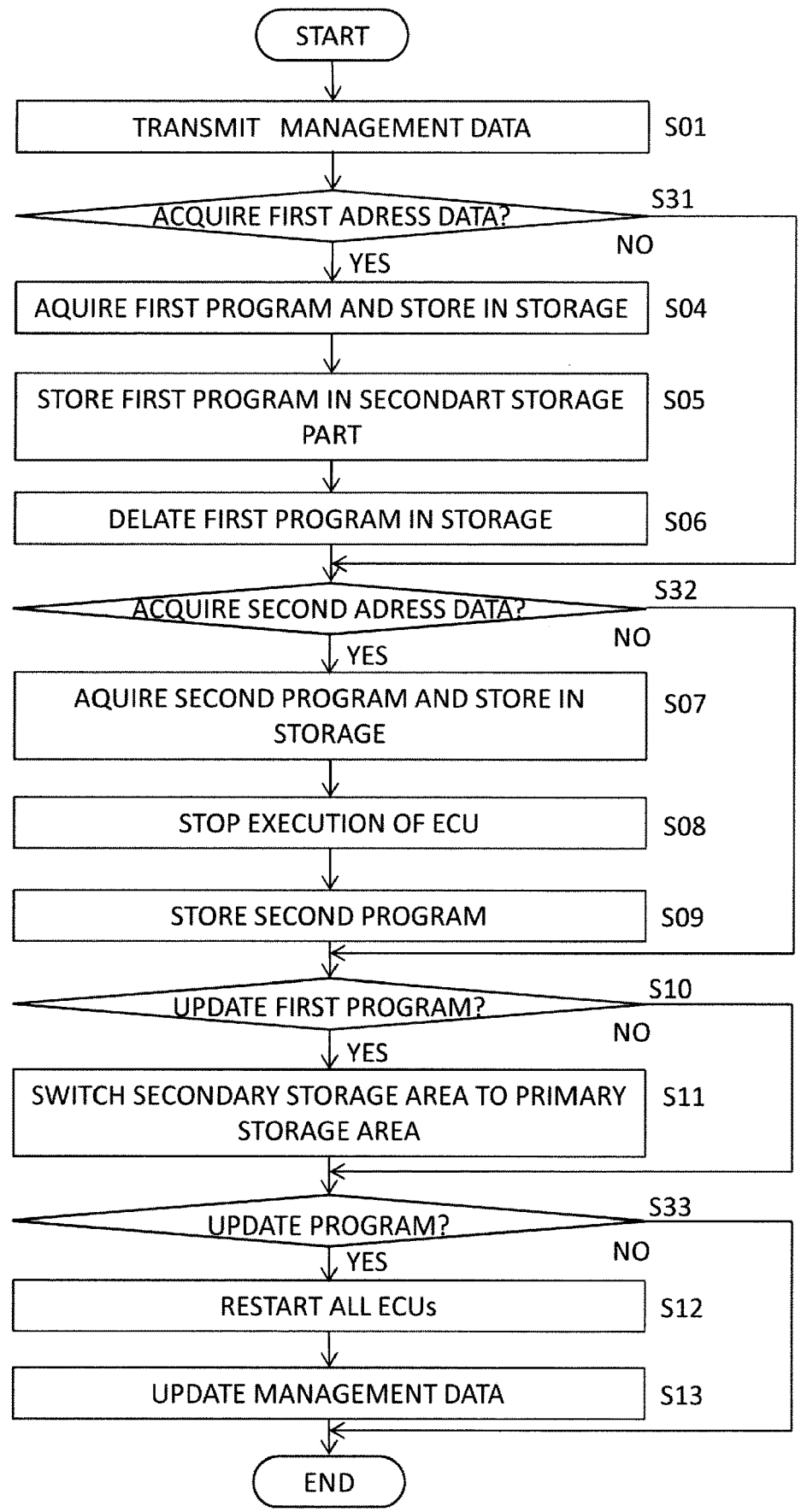
FIG. 8 is a flowchart for explaining an example of a process in the control system according to the second embodiment.
Figure 9:
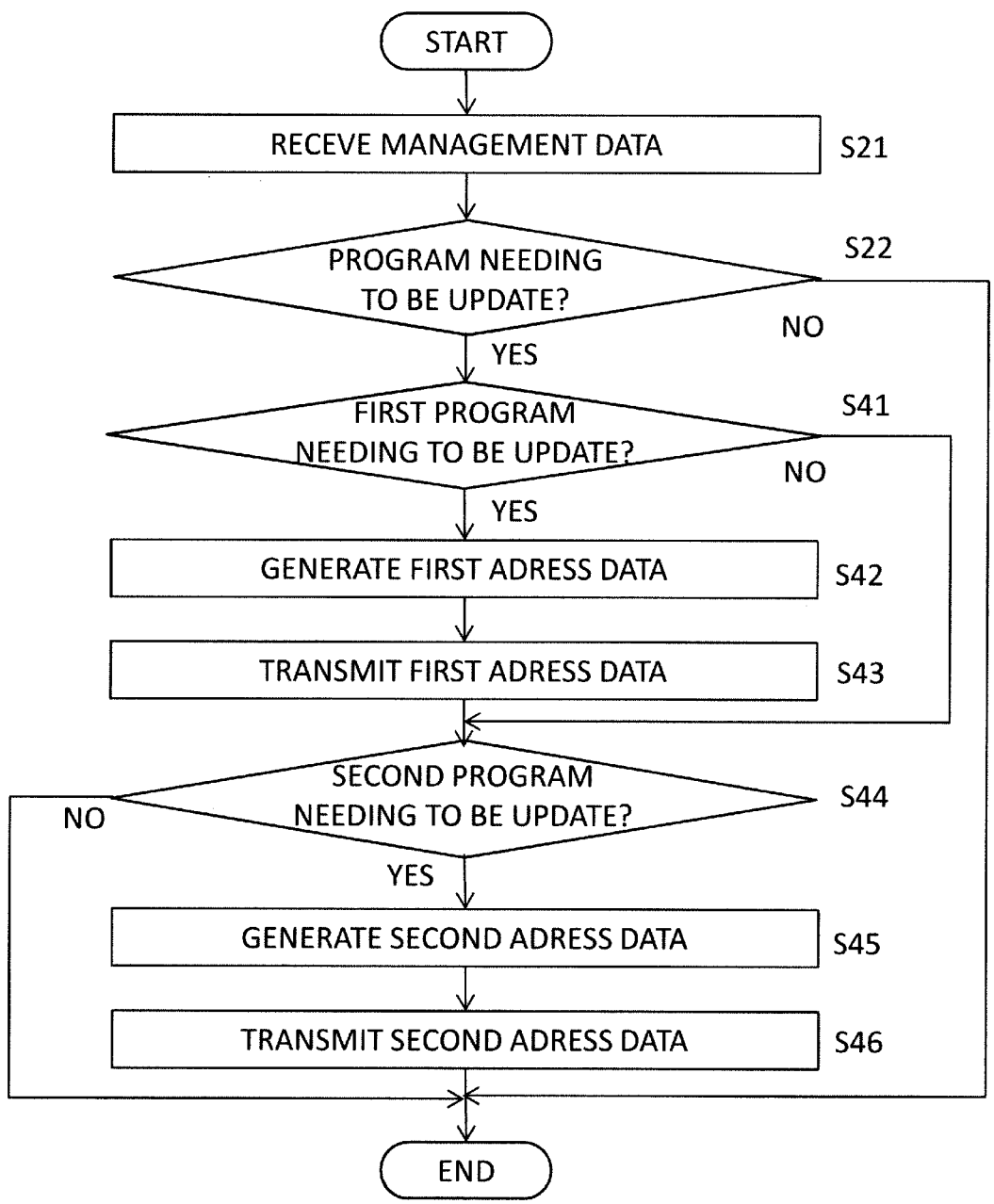
FIG. 9 is a flowchart for explaining an example of a process in a management server according to the second embodiment.

The first address data transmitted from the management server 20A in this way is received by the control system 10B and used for determination (step S31 of FIG. 8).

If no first program needing to be updated exists (NO at S41), the process goes to step S44 without execution of the processes of steps S42 and S43.

If the second program needing to be updated exists (YES at S44), the management server 20A generates the second address data including the address of the second program needing to be updated (S45).

The management server 20A transmits the second address data generated at step S45 to the control system 10B (S46).

The address data transmitted from the management server 20A in this way is received and used in the control system 10B (step S02 and subsequent steps of FIG. 8).

The program update method described above enables simultaneous update of multiple programs, can shorten the stop time due to the simultaneous update in the control system 10B, and reduces the processing load on the control system 10B so that the efficient program update can be implemented.

Third Embodiment

<Program Update System>

Figure 10:
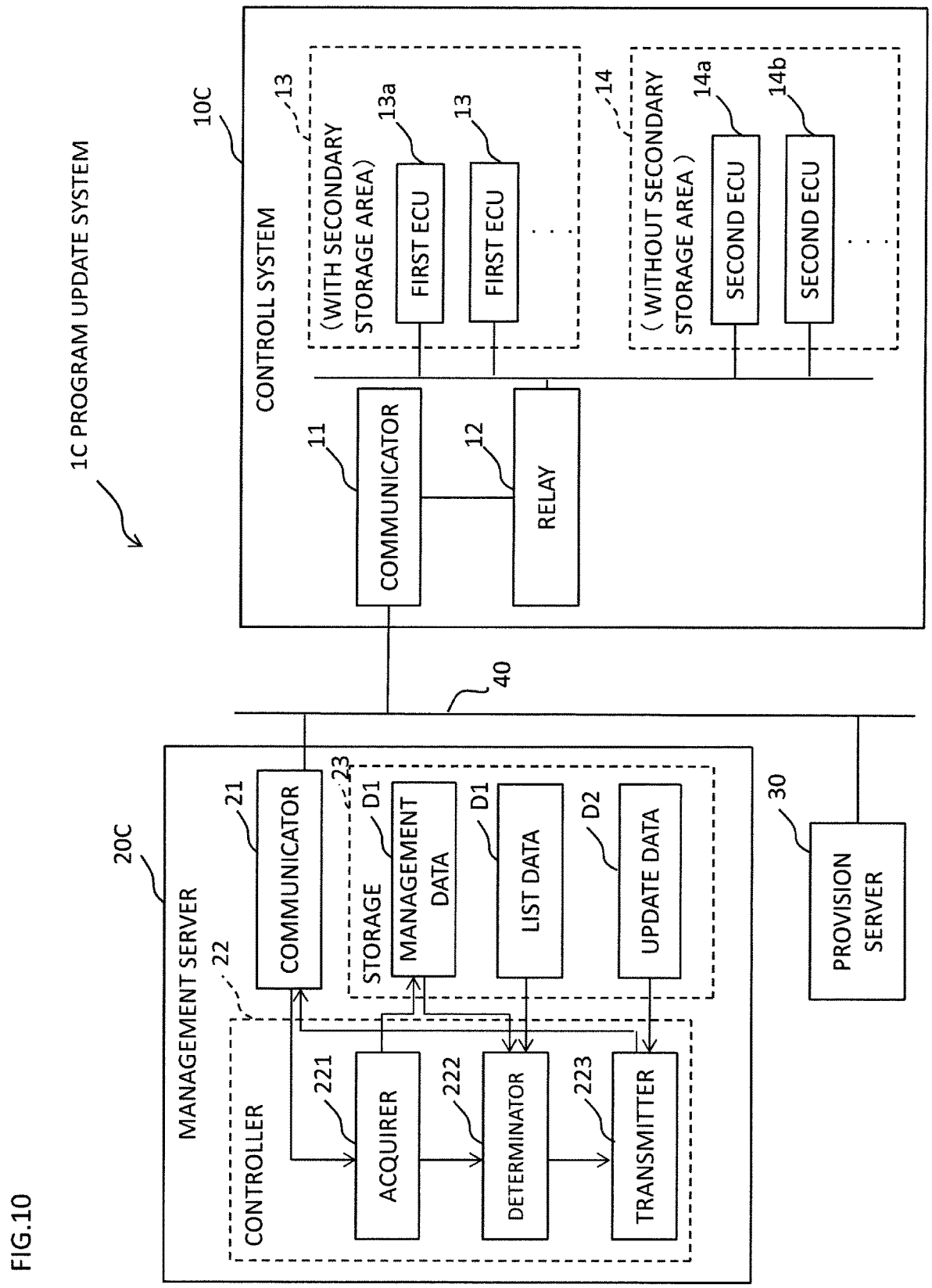
FIG. 10 is a block diagram showing a configuration of a program update system according to a third embodiment.

As shown in FIG. 10, a program update system 10 according to a third embodiment has a configuration in which a control system 100, a management server 20C, and the provision server 30 are connected via the network 40.

In the program update system 1A according to the first and second embodiments, the control systems 10A, 10B acquire the address data through pull-type distribution. In contrast, in the program update system 1C according to the third embodiment, the control system 100 acquires the address data through push-type distribution.

<Control System>

The control system 100 according to the third embodiment has the same configuration as the control system 10B described above with reference to FIG. 7 and therefore will be described with reference to FIG. 7 rather than being shown again.

The control system 10B according to the second embodiment described above with reference to FIG. 7 transmits the management data to the management server 20A at a predetermined timing for confirming whether the programs of the ECUs 13, 14 are updated. In contrast, the control system 10C according to the third embodiment transmits the management data to the management server 20C at the timing when the programs of the ECUs 13, 14 are updated. Therefore, the control system 100 according to the third embodiment does not need to manage the timing of update.

Specifically, at the timing when any of the programs of the ECUs 13, 14 is updated, the management data transmitter 123 transmits to the management server 20C the management data related to the ECUs 13, 14 having the programs updated. Additionally, when the contents of the management data stored in the management data storage 129a are changed by replacing any of the ECUs 13, 14, the management data transmitter 123 also transmits to the management server 20C the management data related to the ECUs 13, 14.

The list acquirer 124 receives the address data when the programs used by the ECUs 13, 14 included in the control system 100 are updated.

Therefore, in the control system 10C according to the third embodiment, only the management data may be transmitted to the management server 20C when the management data is updated at the time of the program update, so that a processing load can be reduced in terms of management of the transmission timing of the management data in the relay 12.

<Management Server>

As shown in FIG. 10, the management server 20C of the third embodiment stores management data D3 in the storage 23 so as to transmit the address data through push-type distribution.

The management data D3 is date associating the identification information of the control system 100 with the identification information of the ECUs such as the model numbers of the ECUs 13, 14 of the control system 100 and the version numbers etc. identifying the versions of the programs stored in the memories of the ECUs 13, 14.

Therefore, in the third embodiment, the acquirer 221 stores the management data acquired from the control system 100 in the storage 23 as the management data D3 together with the identification information of the control system 100.

The determinator 222 reads the management data D3 and the list data D1 from the storage 23 at a predetermined timing rather than the timing of acquisition of the management data by the acquirer 221 from the control system 10C and determines the necessity of the program update of the ECUs 13, 14 of the control system 10C. The predetermined timing in this case is, for example, a periodic timing or a timing when the list data D1 or the management data D3 is updated.

The program update system 1C according to the third embodiment described above enables simultaneous update of multiple programs at the time of the program update in the control system 10C, can shorten the stop time due to the simultaneous update in the control system 10C, and reduces the processing load on the control system 10C so that the efficient program update can be implemented.

<Program Update Method>

An example of a program update process according to the third embodiment will be described with reference to flow-charts shown in FIGS. 11, 12A, and 12B.

(Control System)

The process in the control system 10C of the third embodiment will first be described with reference to FIG. 11.

In the example described above with reference to FIG. 5, the control system 10A acquires the address data in response to the transmission of the management data. On the other hand, the control system 100 acquires the address data through push-type distribution from the management server 20C and therefore receives the address data regardless of the transmission of the management data (S51).

It is noted that the processes of steps S03 to S13 are the same as those described above with reference to FIG. 5 and therefore denoted by the same reference numerals and will not be described The control system 100 transmits the management data updated at step S13 to the management server 20C (S52).

(Management Server)

The process in the management server 20C of the third embodiment will be described with reference to FIGS. 12A and 12B. The same processes as those described above with reference to FIG. 6 are denoted by the same reference numerals. In the management server 20C, the reception of the management data and the transmission of the address data are independent of each other. Therefore, the reception of the management data will be described with reference to FIG. 12A, and the transmission of the address data will be described with reference to FIG. 12B.

Figure 12A:
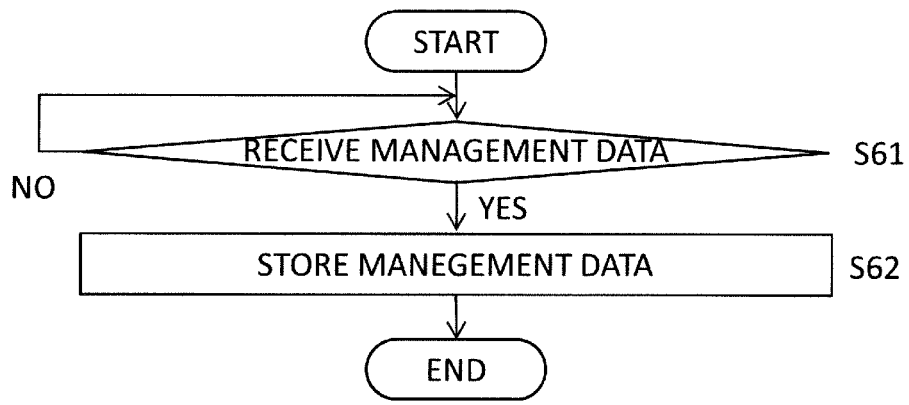
FIG. 12A is a flowchart for explaining an example of a process of management data acquisition in a management server according to the third embodiment.

As shown in FIG. 12A, when receiving the management data transmitted from the control system 10A (YES at S61), the management server 20C stores the management data as the management data D3 in the storage 23 (S62).

Figure 12B:
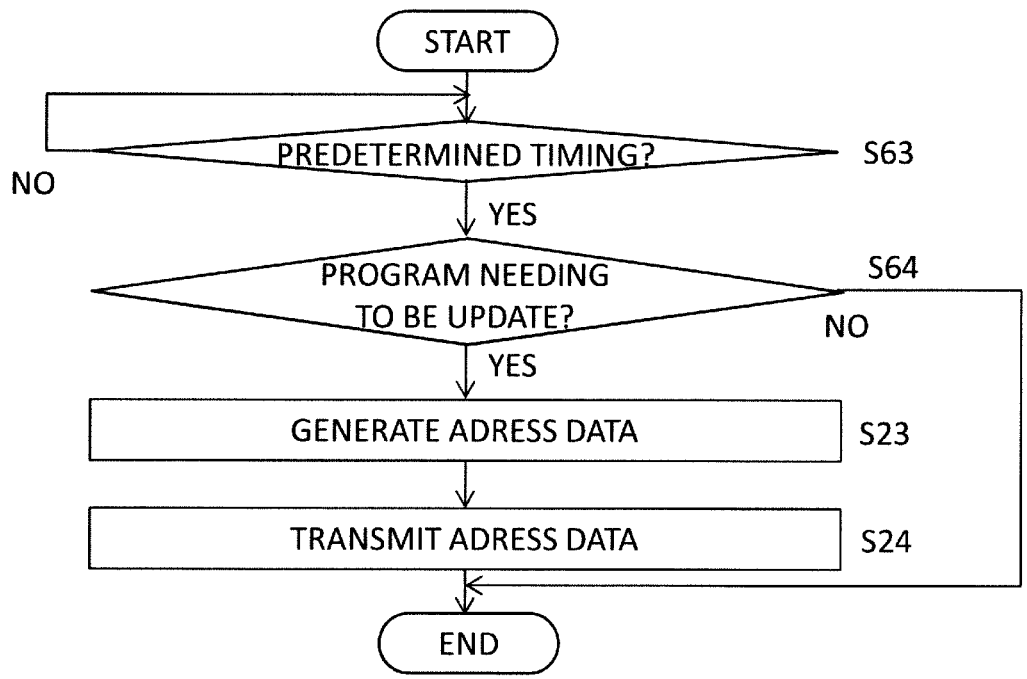
FIG. 12B is a flowchart for explaining an example of a process of address data transmission in the management server according to the third embodiment.

As shown in FIG. 12B, at a predetermined timing (YES at S63), the management server 20C compares the list data D1 and the management data D3 stored in the storage 23 to determine whether a program needing to be updated exists (S64).

If no program needs to be updated (NO at S64), the management server 20C terminates the process.

If a program needing to be updated exists (YES at S64), the management server 20C generates the address data including the address of the program needing to be updated (S23) and transmits the generated second address data to the control system 100 (S24).

The program update method described above enables simultaneous update of multiple programs, can shorten the stop time due to the simultaneous update in the control system 100, and reduces the processing load on the control system 100 so that the efficient program update can be implemented.

<Modification>

The program update system 1C according to the third embodiment described above with reference to FIGS. 10 to 12B has been described with the example in which the management server 20C transmits to the control system 100 the address data including all the addresses for acquiring the programs to be updated. However, as in the program update system 1B according to the second embodiment, the management server 20C may separately transmits the first address data including only the address for acquiring the first program and the second address including only the address for acquiring the second program to the control system 100. This eliminates the need for distinguishing between the address for acquiring the first program and the address for acquiring the second program in the control system 100. Therefore, the processing load on the control system 100 can be reduced.

<Effects and Supplements>

The embodiments have been described above as exemplifications of the techniques disclosed in this application. However, the techniques of this disclosure are not limited thereto and are applicable to embodiments with modification, replacement, addition, omission, etc. made as appropriate.

Overview of Embodiments (1) A program update system of the present disclosure is a program update system updating programs comprising: a management server managing information related to program update; and a control system that is connected to the management server and that includes a plurality of control devices executing the programs and, wherein the management server includes a transmitter transmitting, to the control system, data including an address used for acquiring a program needing to be updated, and wherein the control system includes: a first control device including a primary storage area and a secondary storage area and executing a program stored in the primary storage area; a second control device including a primary storage area without a secondary storage area and executing a program stored in the primary storage area; a program storage temporarily storing an acquired program; a program acquirer preferentially acquiring and storing into the program storage a first program to be stored in the first control device in accordance with data received from the management server, deleting the first program from the program storage when the first program is stored into the secondary storage area of the first control device from the program storage, and acquiring and storing into the program storage a second program to be stored in the second control device; and an update unit storing the second program stored in the program storage into the primary storage area of the second control device and switching the primary storage area and the secondary storage area of the first control device.

This enables simultaneous update of multiple programs at the time of the program update and can shorten a stop time due to the simultaneous update so that the efficient program update can be implemented.

(2) A control system of the present disclosure is a control system connected to a management server that manages information related to program update and including a plurality of control devices executing programs, the control system comprising: a first control device including a primary storage area and a secondary storage area and executing a program stored in the primary storage area; a second control device including a primary storage area without a secondary storage area and executing a program stored in the primary storage area; a program storage temporarily storing an acquired program; a program acquirer preferentially acquiring and storing into the program storage a first program to be stored in the first control device, deleting the first program from the program storage when the first program is stored into the secondary storage area of the first control device from the program storage, and acquiring and storing into the program storage a second program to be stored in the second control device; and an update unit storing the second program stored in the program storage into the primary storage area of the second control device and switching the primary storage area and the secondary storage area of the first control device.

This enables simultaneous update of multiple programs at the time of the program update and can shorten the stop time due to the simultaneous update so that the efficient program update can be implemented.

(3) The control system of (2) further comprises a management data storage storing management data including identification information of the control devices and update information of programs respectively stored in memories of the control devices, and a management data transmitter transmitting management data stored in the management data storage to the management server, wherein when the program acquirer receives, from the management server, address data including an address used for acquiring a program needing to be updated with respect to a program included in the management data, the program acquirer starts acquisition of the first program in accordance with the address data.

This enables simultaneous update of multiple programs at the time of the program update and can shorten the stop time due to the simultaneous update so that the efficient program update can be implemented.

(4) When the second program is stored in the program storage, the update unit of the control system of (3) may stop execution of the programs in the plurality of control devices, store the second program into the memory of the second control device, and restart the control devices.

This can shorten the stop time when the programs are updated so that the efficient program update can be implemented.

(5) The program acquirer of the control system of (2) may acquire a difference between a program stored in the memory of the control device and a latest program.

This can shorten the stop time when the programs are updated so that the efficient program update can be implemented.

(6) A mobile body of the present disclosure may comprise the control system of (2) to (5).

This enables simultaneous update of multiple programs at the time of the program update in a control system of a mobile body and can shorten the stop time due to the simultaneous update so that the efficient program update can be implemented.

(7) A program update method of the present disclosure is a program update method of updating programs in a control system that is connected to a management server managing information related to program update and that includes a plurality of control devices executing the programs, the method comprising: a program storage; a step of preferentially acquiring a first program to be stored in a first control device that includes a primary storage area and a secondary storage area and that executes a program stored in the primary storage area and storing the first program into the program storage temporarily storing a program; a step of storing the first program into the secondary storage area of the first control device from the program storage; a step of deleting the first program from the program storage; a step of acquiring a second program to be stored in a second control device that includes a primary storage area without a secondary storage area and that executes a program stored in the primary storage area and storing the second program into the program storage; a step of storing the second program stored in the program storage into the primary storage area of the second control device; and switching the primary storage area and the secondary storage area of the first control device.

(8) A non-transitory computer-readable recording medium storing a program is a recording medium store a program operable to drive a computer to perform the method of (7).

This enables simultaneous update of multiple programs at the time of the program update and can shorten the stop time due to the simultaneous update so that the efficient program update can be implemented.

The program update system, the control system, the mobile body, the program update method, and the recording medium storing a program according to all claims of the present disclosure are implemented by cooperation etc. with hardware resources, for example, a processor, a memory, and a program.

INDUSTRIAL APPLICABILITY

The program update system, the control system, the mobile body, the program update method, and the program of the present disclosure are useful for program update in a controller included in the mobile body, for example.

EXPLANATIONS OF LETTERS OR NUMERALS 1A, 1B, 1C program update system
10A, 10B, 10C control system
11 communicator
12 relay
122 controller
123 management data transmitter
124 list acquirer
125 determinator
126 program acquirer
127 update unit
129 storage
129a management data storage
129b program storage
13 (13a, 13b) first control device (ECU)
131 controller
132 first memory
133 second memory
134 switch
14 (14a, 14b) second control device (ECU)
141 controller
142 memory
20A, 20C management server
21 communicator
22 controller
221 acquirer
222 determinator
223 transmitter
23 storage
D1 list data
D2 update data
D3 management data
30 provision server
40 network

What is claimed is:

1. A program update system updating programs comprising: a management server managing information related to program update; and a control system that is connected to the management server and that includes a plurality of control devices executing the programs and, wherein
the management server includes
a transmitter transmitting, to the control system, data including an address used for acquiring a program needing to be updated, and wherein
the control system includes
a first control device including a primary storage area and a secondary storage area and executing a program stored in the primary storage area thereof,
a second control device including a primary storage area without a secondary storage area and executing a program stored in the primary storage area thereof,
a program storage temporarily storing an acquired program,
a program acquirer preferentially acquiring and storing into the program storage a first program to be stored in the first control device in accordance with data received from the management server, deleting the first program from the program storage when the first program is stored into the secondary storage area of the first control device from the program storage, and acquiring and storing into the program storage a second program to be stored in the second control device, and
an update unit storing the first program stored in the program storage into the primary storage area of the first control device, storing the second program stored in the program storage into the primary storage area of the second control device, and switching the primary storage area and the secondary storage area of the first control device.

2. A control system connected to a management server that manages information related to program update and including a plurality of control devices executing programs, the control system comprising:
a first control device including a primary storage area and a secondary storage area and executing a program stored in the primary storage area thereof;
a second control device including a primary storage area without a secondary storage area and executing a program stored in the primary storage area thereof;
a program storage temporarily storing an acquired program;
a program acquirer preferentially acquiring and storing into the program storage a first program to be stored in the first control device, deleting the first program from the program storage when the first program is stored into the secondary storage area of the first control device from the program storage, and acquiring and storing into the program storage a second program to be stored in the second control device; and an update unit storing the first program stored in the program storage into the secondary storage area of the first control device, storing the second program stored in the program storage into the primary storage area of the second control device, and switching the primary storage area and the secondary storage area of the first control device.

3. The control system according to claim 2, further comprising a management data storage storing management data including identification information of the control devices and update information of programs respectively stored in memories of the control devices, and a management data transmitter transmitting management data stored in the management data storage to the management server, wherein when the program acquirer receives, from the management server, address data including an address used for acquiring a program needing to be updated with respect to a program included in the management data, the program acquirer starts acquisition of the first program in accordance with the address data.

4. The control system according to claim 3, wherein when the second program is stored in the program storage, the update unit stops execution of the programs in the plurality of control devices, stores the second program into the primary storage area of the second control device, and restarts the control devices.

5. The control system according to claim 2, wherein the program acquirer acquires a difference between a program stored in the primary storage area of the control device and a latest program.

6. A mobile body comprising: the control system according to claim 2.

7. A program update method of updating programs in a control system that is connected to a management server managing information related to program update and that includes a plurality of control devices executing the programs, the method comprising:

preferentially acquiring a first program to be stored in a first control device that includes a primary storage area and a secondary storage area and that executes a program stored in the primary storage area and storing the first program into the program storage temporarily storing a program;

storing the first program into the secondary storage area of the first control device from the program storage;

deleting the first program from the program storage;

acquiring a second program to be stored in a second control device that includes a primary storage area without a secondary storage area and that executes a program stored in the primary storage area and storing the second program into the program storage;

storing the second program stored in the program storage into the primary storage area of the second control device; and switching the primary storage area and the secondary storage area of the first control device.

8. A non-transitory computer-readable recording medium storing a program operable to drive a computer to perform the method according to claim 7.

* * * * *